UNITED STATES PATENT OFFICE.

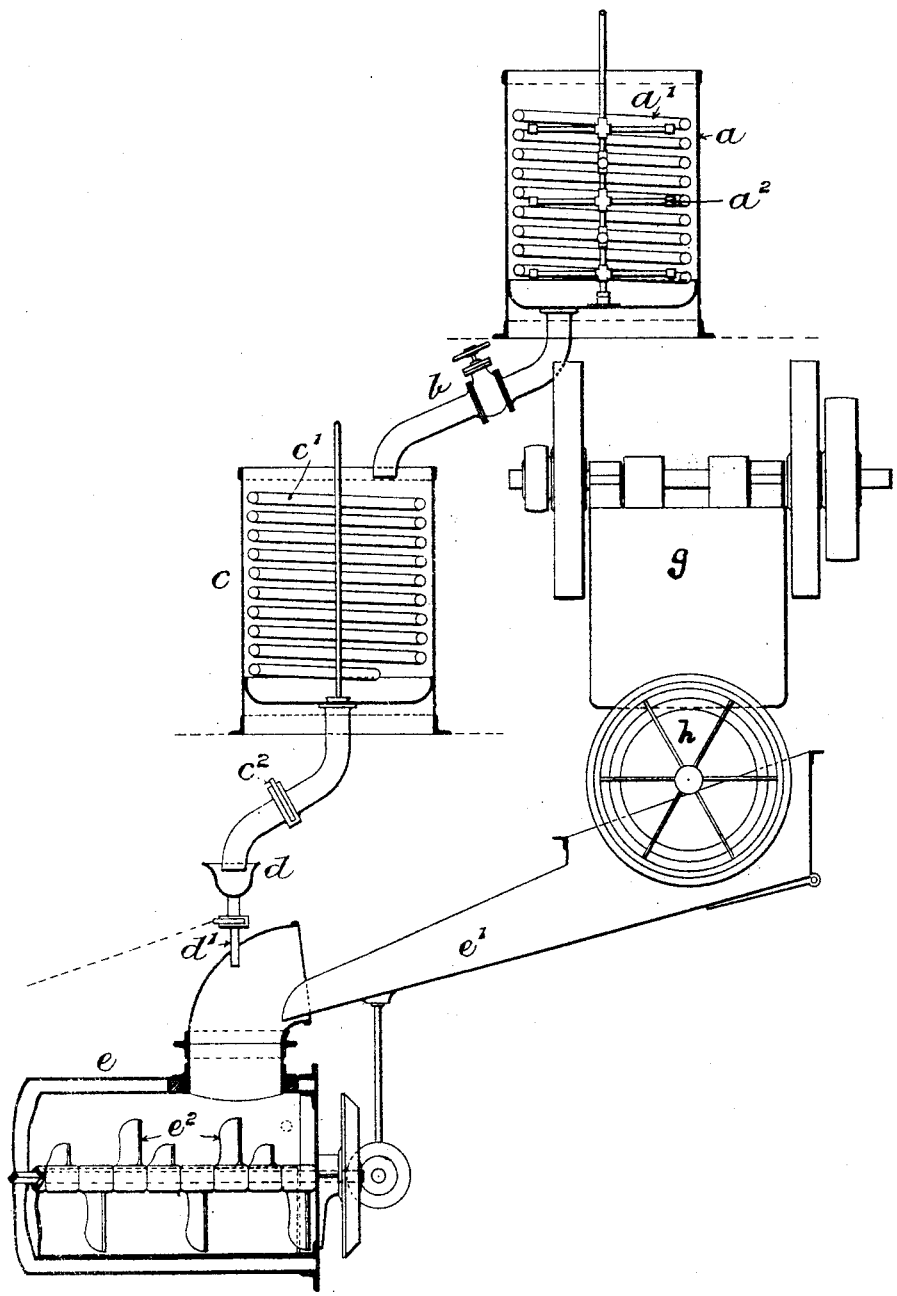

EDGAR PURNELL HOOLEY, OF NOTTINGHAM, ENGLAND, ASSIGNOR TO TARMAC, LIMITED, OF SPRING VALE, ENGLAND.

TAR MACADAM AND METHOD OF PREPARING SAME.

No. 803,902.      Specification of Letters Patent.      Patented Nov. 7, 1905.

Application filed November 3, 1902. Serial No. 129,846.

*To all whom it may concern:*

Be it known that I, EDGAR PURNELL HOOLEY, a subject of the King of Great Britain, and a resident of Nottingham, in the county of Nottingham, England, have invented certain new and useful Improvements in Tar Macadam and the Method of Preparing Same, of which the following is a specification.

Materials such as broken slag, macadam, and other substances of a similar nature suitable for road-making foundations, tar concrete, and other purposes have usually been prepared at considerable expense by hand-labor, the material being first dried and a quantity of heated tar thrown over a heap of the material, which is then moved about by hand-labor until each piece has received a coating of tar. This coating is very thin, lies upon the surface of the material, has very little cohesive power, and when the tarred material is used for road-making the coating soon wears off and the surface of the road is affected by atmospheric conditions.

Now the object of this invention is the preparation of an improved material which is suitable for road-making and other purposes and in which a tarring or coating material or mixture (hereinafter referred to as "tarring material") having considerable cohesive properties not only adheres to the material, but an oily and waterproof liquid penetrates the pores thereof. With this object in view an improved tarring material is employed, and the said material and new hot slag are treated and mixed together so as to insure that the material shall adhere to and penetrate the porous slag.

I will now describe the carrying out of my invention, so that others skilled in the art to which this invention relates may be able to obtain the desired result.

New broken slag—that is, slag direct from the blast-furnace, which is broken up after solidification, but before it gets cold—is impregnated by absorption and coated while hot with hot tarring material. The advantages of using slag direct from the blast-furnace before being allowed to get cold are that it is insured thereby that the slag is absolutely dry, and therefore more permeable to the mixture which makes it perfectly waterproof, and therefore more durable, and that the cost of heating and drying is saved. The tarring material preferably employed is an improved mixture composed of tar, pitch, and resin or their equivalents and with or without the addition of Portland cement. The mixture is "toughened" by the addition of the pitch and resin, and roads constructed thereof besides being impervious to moisture are less likely to be affected by changes of temperature than roads constructed of ordinary tarred macadam. The addition of cement improves the binding qualities of the product. The ingredients of the tarring mixture may be thoroughly mixed together by arms or beaters on a revolving shaft in a vessel heated by steam. The tarring mixture after the mixing process is delivered to a reservoir, in which it is kept heated and from which a regulated supply is distributed over the material to be treated as this material is delivered to the tarring-machine.

The accompanying drawing illustrates the general arrangement of the apparatus.

The mixture by which the material is impregnated may be composed of tar, pitch, Portland cement, and resin in substantially the following proportions: tar, forty gallons, 92.56 per cent., by weight; pitch, twenty-eight pounds, 5.79 per cent., by weight; Portland cement, two pounds, .41 per cent., by weight; resin, six pounds, 1.24 per cent., by weight. Portland cement may be omitted in many cases.

The tar is first placed in the mixer $a$ and by means of the steam-coil $a'$ is gradually raised to and maintained at a temperature of about 212° Fahrenheit during the mixing process. After the tar has been kept at this temperature for about one hour the other ingredients are added and thoroughly mixed together by arms $a^2$ on a central shaft which is rotated by any convenient mechanism. The tarring mixture then passes through the pipe $b$ to a reservoir $c$, in which it is maintained at a temperature of about 212° Fahrenheit by the steam-coil $c'$, and from this vessel the tarring mixture passes by a valve $c^2$ and trough $d$, which has a separate supply-pipe $d'$ to each tarring-machine, (of which there may be several.) The material to be impregnated is passed through any ordinary stone-breaking machine $g$. The various-sized pieces are preferably gaged and separated by a revolving screen $h$ and delivered to separate chutes $e'$, which are pivoted to any fixed support and agitated by suitable means, each chute leading to a separate tarring-machine. Each tarring-machine *e* consists of a cylindrical steam-jacketed vessel, as shown, which may be fixed at any convenient inclination. This vessel has a central shaft, which is rotated by bevel gear-wheels or other suitable gear from the driving-shaft and is fitted with a number of arms $e^2$, preferably of the shape and section shown.

The various parts of the apparatus are provided with steam-supply pipes and valves and also with suitable drain-pipes.

When "tarred macadam," as the material produced is generally termed, is prepared with new hot slag in the manner herein described, every piece of slag is thoroughly coated with an adhesive mixture and also impregnated with an oily and waterproof liquid.

Having now particularly described and ascertained the nature of the said invention and in what manner the same is to be performed, I declare that what I claim is—

1. The process of preparing tar macadam consisting in mixing coating material with newly-solidified hot slag that is to be coated, both the material to be coated and the coating material being at a high temperature throughout the process, as set forth.

2. The process of preparing tar macadam consisting in mixing coating material with newly-solidified hot slag that is to be coated, the coating material being at a temperature of about 212° Fahrenheit previous to mixing, which temperature is substantially maintained throughout the process.

3. Tar macadam consisting of newly-solidified hot slag and tarring material which have been thoroughly mixed while at a high temperature, substantially as described.

4. Tar macadam consisting of newly-solidified hot slag and tarring material which have been thoroughly mixed while at a high temperature the tarring material having penetrated the new hot slag, substantially as described.

5. Tar macadam consisting of newly-solidified hot slag, tar and pitch which have been thoroughly mixed while at a high temperature, substantially as described.

6. Tar macadam consisting of newly-solidified hot slag, tar, pitch and Portland cement, which have been thoroughly mixed while at a high temperature, substantially as described.

7. Tar macadam consisting of newly-solidified hot slag, tar, pitch, Portland cement and resin, which have been thoroughly mixed while at a high temperature, substantially as described.

8. Tar macadam consisting of newly-solidified hot slag, tar, pitch, Portland cement and resin, which have been thoroughly mixed while at a high temperature, the coating ingredients being in the proportions specified.

In testimony whereof I have signed my name to this specification in the presence of two subscribing witnesses.

E. PURNELL HOOLEY.

Witnesses:
 ERNEST MILLER,
 WILLIAM N. POTTER.